May 14, 1968     E. G. KUEHNS     3,383,280

DERMATOLOGICAL ABRADANT STICK-TYPE APPLICATOR

Filed Jan. 9, 1963

INVENTOR.
Ernest G. Kuehns
BY
Joseph G. Schwalbach

United States Patent Office 3,383,280
Patented May 14, 1968

3,383,280
DERMATOLOGICAL ABRADANT STICK-TYPE APPLICATOR
Ernest G. Kuehns, New York, N.Y., assignor to Miles Laboratories, Inc., Elkhart, Ind., a corporation of Indiana
Filed Jan. 9, 1963, Ser. No. 250,363
4 Claims. (Cl. 167—58)

ABSTRACT OF THE DISCLOSURE

A dermatological medicated cleansing device containing abradant material in the form of a solid, stick type applicator useful in treating skin blemishes such as acne and methods for preparing this device.

---

Figure 1:
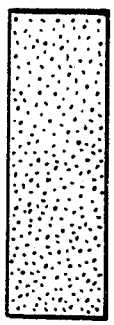

The present invention relates to both a dermatological abradant cleanser in the form of a novel stick type applicator useful in treating skin blemishes and to methods for producing said applicator.

Heretofore the art has endeavored to devise a simple, safe, effective and convenient form of therapy in the treatment of skin blemishes such as acne, excessive scaling, psoriasis, excessive oiliness, superficial bacterial infections and local inflammations. The treatment prescribed varies according to the severity of the condition and, may, in mild or moderate cases, consist of repeated daytime washings to remove the excessive oiliness, scales, and the like, and the nocturnal application of medication. In all cases, however, the therapy is directed toward decreasing the output of the sebaceous glands, controlling inflammation and cyst formation, softening the crusty skin lesions and preventing scarring. This treatment usually comprises X-ray therapy, antibacterial therapy and environmental change. Possible harmful genetic effects during exposure to X-ray, the emergence of antibiotic resistant bacteria, and excessive washing of the affected areas are obvious difficulties in this treatment regime. Although many attempts have been made to overcome the foregoing difficulties in the treatment of skin disorders and blemishes, none has been entirely successful, clinically or commercially.

It is an object of the present invention to provide a safe, effective, inexpensive, cosmetically acceptable means of treating skin blemishes.

Another object of the invention is to provide an aid in the cleansing, disinfecting, drying and abrading of skin blemishes.

The invention further contemplates the utilization of a medicated abradant stick type applicator which may be directly applied to the affected areas, obviating the possible contamination of (or by) the fingers and hands of the user.

A further object of the invention is to provide an improved abradant-cleanser stick type applicator of the aforementioned character which, in one form thereof, automatically provides varying degrees of abradant action as the stick is depleted.

It is a further object of the invention to provide novel methods of producing the improved abradant stick.

Various other objects and advantages will appear from the following description of the invention and the novel features will be particularly pointed out hereinafter in connection with the appended claims.

Within the inventive concept skin blemishes resulting from acne, psoriasis, excessive oiliness, superficial bacterial infections, local inflammation and the like can be conveniently, simply and effectively treated by the stick type applicator means of the present invention which contains abradant particles dispersed within a medicated detergent base. More specifically, the improved stick type applicator in its preferred form includes a dessicating substance and an antibacterial in addition to the abradant, all combined in a detergent base.

As a dessicant, colloidal sulfur may be employed within a concentration of 0.5% to 10%, although a 1% concentration has been found to be suitably effective.

Any non-irritating antibacterial agent may be employed. As examples, 2,2′-methylene bis(3,4,6 trichlorophenyl), i.e. hexachlorophene, and bithionol have been satisfactorily incorporated into the formulations of this invention in a concentration of from about 0.5% to about 3%. Inorganic abradant matter such as fused aluminum oxide powder or finely powdered pumice, sterilized by any suitable means such as heat or ethylene oxide, are acceptable for use as the abradant substances in the improved applicator and are utilized in ranges of from about 5% to about 25%. Organic abradant matter such as ground corn husks, soya bits, almond meal and the like may also be used in similar ranges of from about 5% to 25% and may be likewise sterilized with ethylene oxide treatment. Mesh sizes for various abradants which have proved satisfactory are the following ranges: pumice, 100 to 300; alumina, 100 to 300; soya bits 40 to 300; almond meal, 100 to 300; and ground corn husk, 10 to 300.

The function of each ingredient is utilized effectively in the control of skin blemishes with the improved stick type applicator which first unblocks pilosebaceous follicles, thereby permitting the escape of sebum, and subsequently affords cleansing, degreasing, drying and degerming the lesion previously formed. The hexachlorophene or biothionol suppresses possible pathogens and decreases the incidence of infection. The colloidal sulfur dessicates, and the abradant peels the lesions. The special detergent base provides a means for dissolving oils, dirt and debris on the surface of the skin. In one preferred form, the base is comprised of a water soluble detergent substance such as sodium lauryl sulfonate or sodium alkyl sulfoacetate, rather than an alcohol soluble detergent which is heat-labile. Further said base is perferably buffered at the pH of the skin, viz. pH 5, but it may be buffered at any other pH desired by suitable substances such as citric acid. Various self-emulsifying waxes and water-soluble synthetic waxes, i.e. cetyl alcohol, polyethylene glycol of varying molecular weights are used in order to form the matrix.

Figure 2:
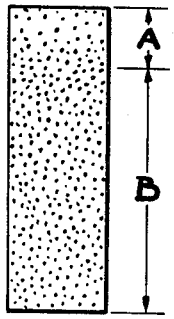

The invention may be best understood when the ensuing description is taken in connection with the accompanying drawings wherein;

FIGURE 1 is a semidiagrammatic axial sectional view of one form of the abradant stick type applicator in accordance with the inventive concept; and FIGURE 2 is a view similar to FIGURE 1 showing another form of abradant stick type applicator in accordance with the present invention.

In the preparation of the improved applicator sticks of the present invention the various self-emulsifying waxes and water-soluble synthetic wax components of the sticks are melted together in this respective group order and the active ingredients above described are added to the melt, citric acid being added to the melt to effect the desired pH. The abrasive is added to the melt last, and the entire mix is cooled with stirring to between 50° and 75° C. and poured into cylindrical or other conveniently shaped stick-forming molds or dispensing containers for the applicator stick. Upon final cooling, the applicator sticks are placed in suitable convenient holders or dispensers (not shown) if they were not molded therein initially.

The resulting preparation is a stick type applicator which obviates the need for cloth, sponge, or digital application to the affected areas. Further, the direct application of the abradant stick to the skin facilitates localization of the abradant action and avoids possible contamination which sometimes results from digital massaging after pustule rupture. The degree of abrasion may thereby be readily controlled and determined by the user and may be accomplished by varying the pressure with which the stick is applied to the affected skin surface.

The invention contemplates a stick type applicator wherein the abradant particles are substantially uniformly dispersed therein as shown in FIGURE 1, which applicator is formed in a single pouring operation as will be described hereinafter. The invention additionally contemplates a stick type applicator such as that shown in FIGURE 2 wherein the dispersion of the abradant particles therein is not uniform throughout the length thereof. Rather, in the form of the invention illustrated in FIGURE 2 a minor portion of the length of the applicator designated by the letter A contains a dispersion of abradant particles which varies from a density at its inner end of approximately that of the density of abradant particles in portion B to a substantially lighter density of said particles at the outer end of said portion A. In FIGURE 2, the major portion of the length of the stick, designated by the letter B, contains a substantially uniform dispersion of abradant particles.

The applicator stick of FIGURE 2 may be made by a two-step pouring process utilizing a single melt and a higher temperature in the second pour. Alternatively the stick of FIGURE 2 may be produced by using two melts, whereby the second pour, having a lower density of abradant than that of the first pour. Where a second pour is employed at increased temperature, it may be carried out at from about 30 minutes to one hour after the first pour and is effected at a temperature which melts the contiguous upper surface area of the first pour, i.e. portion B of FIGURE 2, so that said portion blends with and becomes fused to the portion A formed by the second pour, forming a unitary stick.

The higher temperature of the second pour has the further novel aspect of causing a noticeable settling of the suspended abrasive material by reason of the decreased suspending ability of the melt at the higher temperature. Thus, in one aspect there is provided a stick type applicator having a first zone containing a relatively higher concentration of abrading substance and comprising the major portion of the length of the stick; said first zone being fused to an uppermost second layer or zone containing a relatively lower concentration of abradant. There is a marked gradation in the density of abradant from top to bottom of said second layer or zone A resulting from the settling of abradant particles prior to solidification of said layer with the result that at the outer end of said second layer the concentration of abradant is relatively low, whereas at the inner end of said layer, the concentration of abradant approaches or may be slightly higher than that of the first zone.

The invention also contemplates a stick which has, for example, a plurality of second zones or layers each having a density of abradant therein different from that of the adjacent layers. As one layer is utilized and depleted by the user increasing degrees of abrasion are automatically applied. Once the lower zone or layer B emerges, however, the amount of abrading action effected is determined by the amount of pressure with which the stick is applied to the skin.

The rationale of the therapy thus provided is that the initially untreated and affected skin is quite tender and no needs exists for a harsh abrasion thereof at the outset of treatment. However, as the condition responds to the abrasive treatment and keratolysis occurs, an increased amount of abrasion is needed to accomplish the continued and desired keratolytic effect. The increased amount of abradant present in the lower zone or layer provides the more concentrated abrading action at the time when it is needed to accomplish the desired result.

For the purpose of affording those skilled in the art a better understanding of the invention, the following illustrative examples are given:

*Example I.—One melt single pour*

| Ingredients: | Weight, grams |
|---|---|
| Polyethylene glycol (Carbowax mol. wt. 1540) | 40 |
| Polyethylene glycol (Carbowax mol. wt. 4000) | 10 |
| Cetyl alcohol | 10 |
| Polawax (non-ionic emulsifying wax) | 10 |
| Sodium lauryl sulfoacetate | 5 |
| Colloidal sulfur | 1 |
| Hexachlorophene | 1 |
| Magnesium stearate | 1 |
| Fused aluminum oxide, mesh size 200 | 21 |
| Citric acid | 1 |
| | 100 |

The waxes were mixed together and heated to 70° C.; the colloidal sulfur, hexachlorophene and detergent were added and stirred until a homogeneous melt was obtained; the magnesium stearate, citric acid and fused aluminum oxide were then added in that order. Stirring was continued and the mix cooled to 60° C., after which it was poured into siliconized, lubricated dispensing containers having cylindrical cavities of a diameter of 25 mm. and a length of 75 mm. Thus the containers formed both the mold and the dispenser means for the stick formed therein. The single pour was made to the very top of the container and the mix allowed to cool and congeal into the stick type applicator. The stick thus formed contained a uniform dispersion of abradant throughout as shown in FIGURE 1. In utilizing this type of applicator any desired amount of abradant action may be achieved by exerting the necessary pressure on the skin surface with the abradant stick.

*Example II.—One melt double pour*

In an identical manner as that described in Example I the various ingredients were incorporated stepwise into a suitable container, and in stepwise fashion melted at a temperature of about 80° C. The method of admixture was identical to that described in Example I. Stirring was continued with cooling until the mix was at 60° C., after which pouring was effected into siliconized molds having the general dimensions aforedescribed. The mold cavities were filled to within about 15 mm. of the top by less than all of the prepared melt. The temperature of the remaining melt was then raised to, and maintained at about 75° C., and a second pouring made at about 45 minutes after the first. In the second pouring step, the mold cavities were filled to the top to provide the second layer which, upon cooling and congealing was characterized by the gradations in abradant density illustrated in the portion A of FIGURE 2. The first pour B was thus fused to the second pour A; said first pour having a generally higher uniform concentration of abradant.

*Example III.—Two melt double pour*

In this example a formulation somewhat different from that of Example I was employed in effecting the first melt of a two melt double pouring procedure, and the same formulation, but with 20% less abradant, was used in the melt for the second pour. The formulation for the first melt contained the following:

| Ingredients: | Weight, grams |
|---|---|
| Polyethylene glycol (Carbowax mol. wt. 1540) | 40 |
| Polyethylene glycol (Carbowax mol. wt. 4000) | 10 |
| Cetyl alcohol | 10 |
| Polawax (non-ionic emulsifying wax) | 10 |
| Sodium lauryl sulfoacetate | 5 |
| Colloidal sulfur | 1 |
| Hexachlorophene | 1 |
| Magnesium stearate | 1 |
| Fused aluminum oxide, mesh size 100 | 23.2 |
| Citric acid | 1 |

The second melt contained the same ingredients as above but differed therefrom in that it contained 18.6 grams of fused aluminum oxide.

The methods of pouring were identical to those described in Example II and were, likewise, effected at about 70% C. in the first pour and at about 90° C. in the second pour. The second melt thereby fused to the congealed, cooled just-poured first melt, forming a stick comprising unified contiguous layers of abradant containing matrix.

*Example IV.—One melt single pour organic abradant*

Ingredients: Weight, grams
| | |
|---|---|
| Polyethylene glycol (Carbowax mol. wt. 1540) | 40 |
| Polyethylene glycol (Carbowax mol. wt. 4000) | 10 |
| Cetyl alcohol | 10 |
| Polawax (non-ionic emulsifying wax) | 10 |
| Sodium lauryl sulfoacetate | 5 |
| Colloidal sulfur | 1 |
| Hexachlorophene | 1 |
| Magnesium stearate | 1 |
| Soya bits, mesh size 50 | 21 |
| Citric acid | 1 |
| | 100 |

The same method of mixing of ingredients and procedure for pouring the melt into the dispensing molds was followed as in Example 1. The stick type applicator thus formed contained a similarly uniform dispersion of abradant throughout as shown in FIGURE 1.

*Example V.—One melt single pour organic abradant*

The ingredients in this example were identical to those listed above in Example IV except for the substitution of ground, sterilized corn husks having a mesh size of 150. The same methods of mixing and pouring were followed as in Example IV.

In determining the concentration of each layer of the abradant applicator sticks, said sticks were cut or sliced and the amount of the abradant determined by subsequently degrading the melt. The concentration of similar layers varied from about 5% to 7%.

It is apparent from the foregoing that it is contemplated that the pourings may be done in a one-step or two-step fashion by employing either a one melt pour i.e. a single concentration of inorganic or organic abradant varying from about 5% to 25% of the total weight, or a two melt pour in which the first melt contains about 10% to 30% more abradant than the second melt but the total abradant of said composition is within the 5% to 25% of the total weight.

Further, various other medications useful in the treatment of other skin disorders may be incorporated into the applicator stick matrix. This would include various other antiseptics, dessicants, keratolytics, coloring agents, perfumes and essences and other abrasive materials. The pH of the detergent base may be adjusted upward or downward from 1 to 14, but, by the addition of citric acid, is preferably maintained at 5.0 which is the pH of the skin. It will be understood that any other suitable acid may be substituted therefor in order to effect changes in, or to maintain the pH at 5.0

It is to be observed that the present invention relates to stick type applicator means for the topical treatment of skin blemishes and disorders and to methods for preparing such a stick type applicator means; said applicator being characterized by the presence of medicated and abradant means; the latter, i.e. the abradant means being present in uniform concentration, homogeneously distributed through the matrix origin, varying concentrations along the length of the stick to afford increasing abrasive action with continued use until a predetermined level of abrasive action is reached, after which no further increase occurs with continued use. The variation in abradant density within a given layer or zone is achieved by pouring the melt at a selected temperature which results in a predetermined settling of suspended abradant particles before solidification of the matrix or supporting base material.

Although the present invention has been described in conjunction with a number of embodiments, other modifications and variations may be resorted to without departing from the scope and spirit of the invention, as will be readily understood by those skilled in the art. All such modifications and variations are contemplated as will come within the scope of the appended claims.

What is claimed is:

1. A dermatological stick-type applicator useful in the topical treatment of acne comprising a solid wax matrix containing an antibacterial selected from the group consisting of hexachlorophene and bithional and an abradant selected from the group consisting of fused alumina of mesh size 100 to 30, powdered pumice of mesh size 100 to 300, soya bits of mesh size 40 to 300, almond meal of mesh size 100 to 300 and ground corn husks of mesh size 100 to 300; said abradant being suspended in upper and lower layers of said matrix; said upper layer having a lesser amount of abradant than said lower layer.

2. An applicator as in claim 1 in which the antibacterial comprises about from 0.5% to about 3% by weight of the composition.

3. An applicator as in claim 1 which additionally comprises about from 0.5% to about 10% by weight of colloidal sulfur.

4. A solid stick-type applicator useful in the topical treatment of acne consisting essentially of the following ingredients in percent by weight:

| | |
|---|---|
| Polyethylene glycol (M.W. 1540) | 40 |
| Polyethylene glycol (M.W. 4000) | 10 |
| Cetyl alcohol | 10 |
| Non-ionic emulsifying wax | 10 |
| Lauryl sodium sulfoacetate | 5 |
| 2,2'-methylene bis(3,4,6 trichlorophenol) | 1 |
| Magnesium stearate | 1 |
| Fused alumina | 21 |
| Citric acid | 1 |
| Colloidal sulfur | 1 |
| Total | 100 |

References Cited

UNITED STATES PATENTS

| | | | |
|---|---|---|---|
| 1,230,149 | 6/1917 | Greer | 106—19 |
| 2,087,161 | 7/1937 | Moore | 167—90 |
| 2,222,969 | 11/1940 | Kistler | 167—90 |
| 2,970,083 | 1/1961 | Bell | 167—90 |
| 2,980,524 | 4/1961 | Morton | 51—293 |
| 3,092,111 | 6/1963 | Saperstein | 167—90 |

FOREIGN PATENTS 555  2/1881  Great Britain.

OTHER REFERENCES

Journal American Med. Assoc., Dec. 15, 1962, vol. 182, No. 11, page 213 "Carbowax-Polyethylene Glycols," Booklet of Union Carbide Chemicals Co., 1958, pages 7, 8, 13, 14, 15, 17, 18, 19, 21, 57.

ALBERT T. MEYERS, *Primary Examiner.*

JULIAN S. LEVITT, *Examiner.*

A. FAGELSON, M. J. COHEN, *Assistant Examiners.*

UNITED STATES PATENT OFFICE
CERTIFICATE OF CORRECTION

Patent No. 3,383,280                                      May 14, 1968

Ernest G. Kuehns

It is certified that error appears in the above identified patent and that said Letters Patent are hereby corrected as shown below:

Column 2, line 25, "10" should read -- 100 --. Column 5, line 6, "70% C." should read -- 70° C. --. Column 6, line 19, "bithional" should read -- bithionol --; line 21, "30," should read -- 300, --.

Signed and sealed this 11th day of November 1969.

(SEAL)
Attest:

Edward M. Fletcher, Jr.                            WILLIAM E. SCHUYLER, JR.
Attesting Officer                                           Commissioner of Patents